Figure 1:
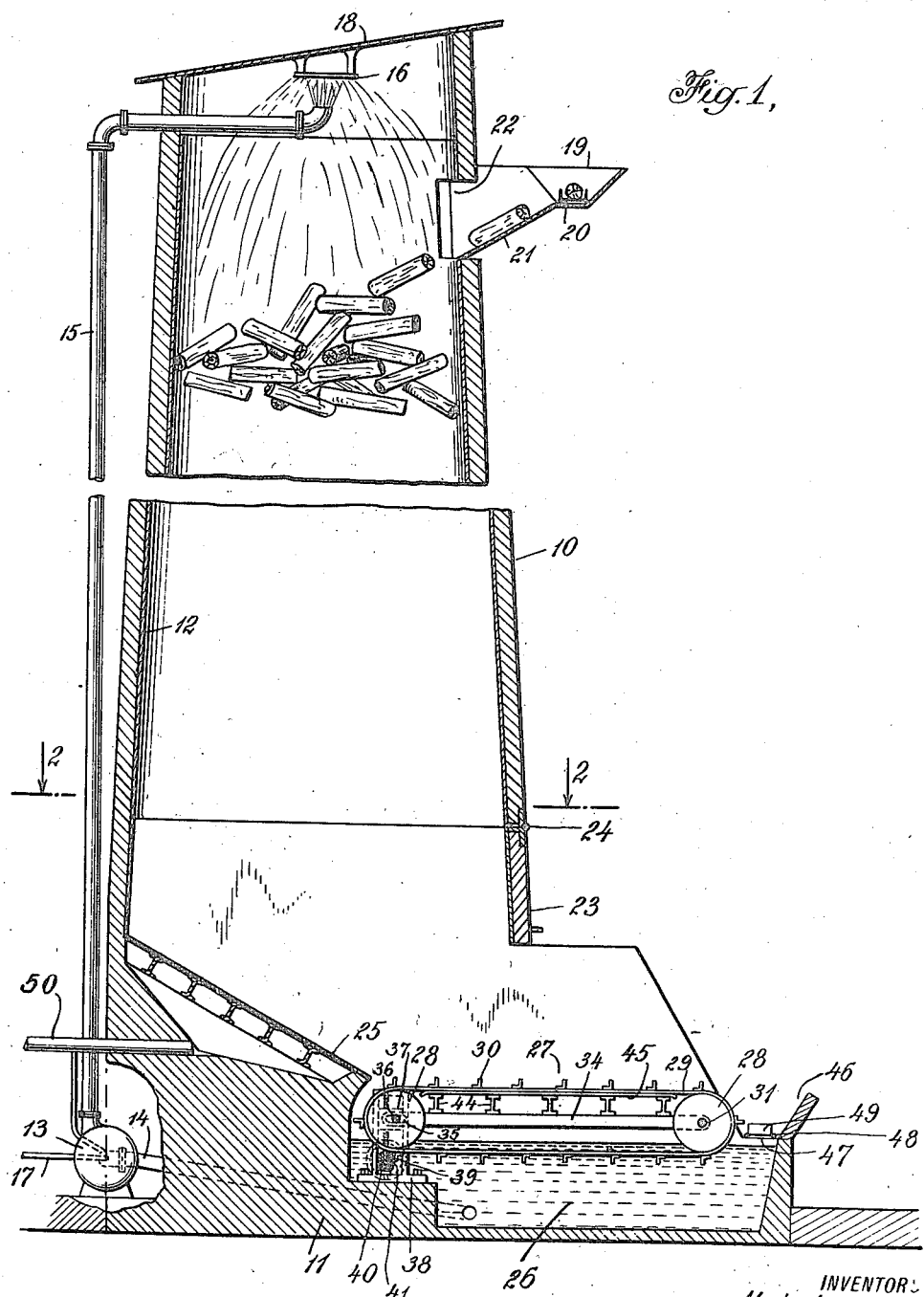

O. L. BERGER & H. GUETTLER.
WOOD SOAKING TOWER.
APPLICATION FILED DEC. 6, 1917.

1,283,051.

Patented Oct. 29, 1918.
2 SHEETS—SHEET 1.

INVENTORS
Herbert Guettler
Ole L. Berger
BY
Pennie, Davis, Marvin + Edmonds
ATTORNEYS

O. L. BERGER & H. GUETTLER.
WOOD SOAKING TOWER.
APPLICATION FILED DEC. 6, 1917.

1,283,051.

Patented Oct. 29, 1918.
2 SHEETS—SHEET 2.

INVENTORS
Herbert Guettler
Ole L. Berger
BY
Pennie, Davis, Marvin + Edmonds
ATTORNEYS

UNITED STATES PATENT OFFICE.

OLE LUDVIG BERGER, OF PORT EDWARDS, WISCONSIN, AND HERBERT GUETTLER, OF CHICAGO, ILLINOIS, ASSIGNORS TO FIBER MAKING PROCESSES, OF CHICAGO, ILLINOIS, A CORPORATION OF ILLINOIS.

WOOD-SOAKING TOWER.

1,283,051.     Specification of Letters Patent.    Patented Oct. 29, 1918.

Application filed December 6, 1917. Serial No. 205,812.

*To all whom it may concern:*

Be it known that we, OLE LUDVIG BERGER, a citizen of the United States, residing at Port Edwards, county of Wood, State of Wisconsin, and HERBERT GUETTLER, a subject of the King of Norway, residing at Chicago, county of Cook, State of Illinois, have invented certain new and useful Improvements in Wood-Soaking Towers; and we do hereby declare the following to be a full, clear, and exact description of the invention, such as will enable others skilled in the art to which it appertains to make and use the same.

The present invention relates to soaking towers, or hot ponds as they are sometimes called, particularly adapted for treating logs before they are fed to apparatus for removing the bark.

It is found that with the use of such apparatus, especially of the type comprising a rotating drum within which the logs are placed, the removal of the bark by the tumbling action of the logs upon each other is greatly facilitated if the logs are soaked for some time before being barked.

An object of the present invention is the provision of an apparatus of simple and substantial construction by means of which the preliminary soaking of the logs may be carried out with a minimum expenditure of labor and power. Briefly described, the apparatus comprises a tower into the top of which the logs are fed and through which they move gradually until they finally reach a conveyer at the base of the tower by which they are carried away to the barking drum or other apparatus. Means are provided at the top of the tower for supplying hot water, or a suitable solution which will tend to loosen the bark from the logs. In order to maintain a circulation of the liquid through the tower, the means for supplying the liquid to the top of the tower has a connection leading to the bottom of the tower from which locality the liquid may be drawn and then pumped into a discharge jet at the top of the tower. The wall of the tower is provided with one or more openings to permit access to the interior for examination of the logs or removal of the same in case of necessity. Within the base of the tower is a conveyer by means of which the logs may be carried away to a flume for delivery to the barking drum by which the bark is to be removed.

Figure 2:
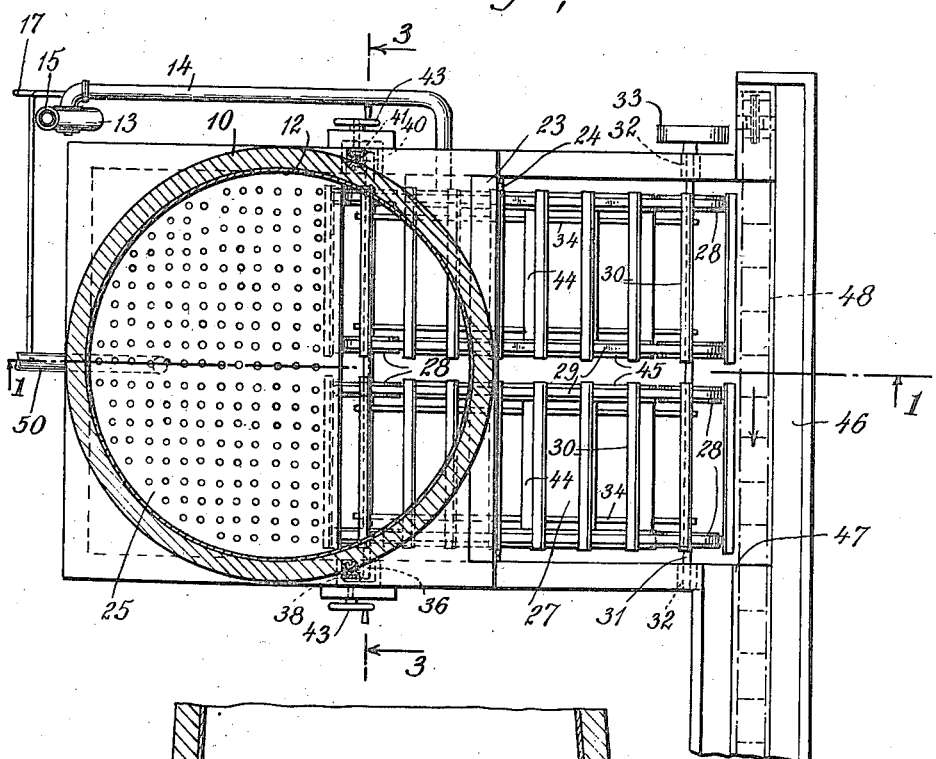
Figure 3:
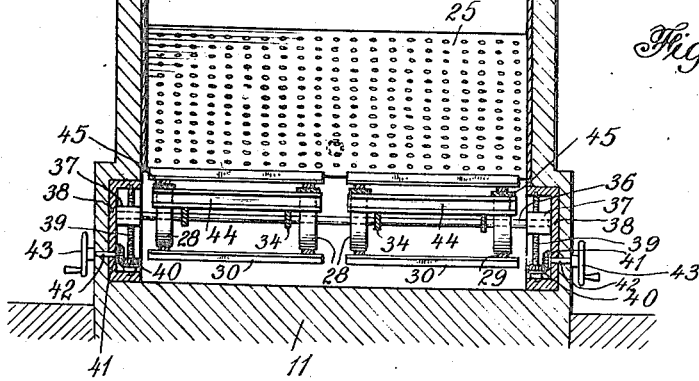

The details of the apparatus, as well as other advantages of the invention will appear more clearly from a description of a preferred embodiment thereof as shown in the accompanying drawings in which Figure 1 is a sectional elevation along the line 1—1 of Fig. 2, Fig. 2 is a plan view in section along the line 2—2 of Fig. 1, and Fig. 3 is a sectional elevation of the base of the apparatus along line 3—3 of Fig. 2.

Referring to the drawings in which similar reference characters denote similar parts in the different views, 10 represents a tower which may be constructed of cement, concrete or any other appropriate material and which is mounted upon a base portion 11 which may also be constructed of the same or of different material as desired. While the base portion of the apparatus is of substantially rectangular form, the tower itself is preferably circular, with its sides converging toward the top. If necessary, the interior of the tower may be lined, as indicated at 12, with metal or any appropriate material suitably resistant to the liquid used for treating the logs. This liquid may be hot fresh water, or in case the apparatus is used in paper mills where a supply of sulfite liquor is available, the latter may be heated and used in the soaking tower. The liquid is supplied to the top of the tower by a pump 13 which in the present case is shown as a simple centrifugal pump having its main intake 14 leading from the base of the apparatus and its outlet port connected to a pipe 15 which discharges against a deflector 16 attached to a cover 18 which also serves to lessen the loss of liquid by evaporation from the top of the tower. To provide for renewing the liquid from time to time, the pump is provided with an auxiliary inlet 17 leading to the source of water or sulfite liquor supply.

Logs are brought to the tower by a conveyer which may be of any desired construction. As here shown it is in the form of a flume 19 provided with a chain conveyer 20 having projections by which the logs are drawn opposite log-deck 21 down which they are then discharged through an aperture 22 into the top of the tower. At the base of the tower a door 23 hinged as at 24, is provided to permit access to the interior of the tower for the purpose of cleaning the same, or for breaking up a log jam, if one should form.

Beneath a portion of the tower is an inclined perforated shelf 25. The remaining portion of the base of the apparatus is formed as a tank 26 above which is a conveyer 27 having one end adjacent the lower end of shelf 25. The conveyer comprises wheels 28 over which pass a number of chains 29 having upon their outer surfaces angle bars 30 to engage the logs and carry them out of the tank. The conveyer may be made up with two sections of chains and angle bars as shown in Figs. 2 and 3. The forward wheels of each section of the conveyer may be attached to a common shaft 31 mounted in bearings 32 in the side walls of the tank. One end of the shaft is extended beyond the wall and carries a driving pulley 33 belted to a source of power. While the rear set of wheels 28 may be mounted in similar bearings attached to the side walls of the base of the apparatus, it is preferable to mount this set of wheels so as to permit of vertical movement. For this purpose, the conveyer has a frame work comprising longitudinal bars 34 supported, at the forward end of the apparatus, upon the shaft 31 and having, at the rear of the conveyer, slots 35 to receive the shaft 36 of the corresponding set of wheels 28. This shaft is, at its ends, supported in bearing blocks 37 slidably mounted in slotted brackets 38 attached to the horizontal floor of the tank. The bearing blocks are threaded to receive screws 39 which are mounted in bearings in the brackets and have bevel gears 40 coöperating with bevel gears 41 on the ends of shafts 42 extending through the side walls of the base of the apparatus. The outer ends of these shafts are thus in position to be conveniently reached by the operator of the apparatus and are provided with hand wheels 43 by which they may be rotated. To prevent the traveling parts of the conveyer from sagging under the weight of the logs, transverse bars 44 are attached to the upper edges of the supporting bars 34, and the conveyer chains travel along guides 45 attached to the upper edges of bars 44. The chains have enough slack to permit the vertical movement of the rear end of the conveyer as described above. At the outer end of the conveyer is a flume having a side wall 46 and a base 47 upon which is a belt or chain 48 having upstanding members 49 to engage the logs and carry them through the flume to the apparatus where the bark is to be removed. For the purpose of supplying steam to the water or sulfite liquor to keep it hot during treatment of logs a steam pipe 50 extends to the space beneath shelf 25.

When the apparatus is brought into use initially, enough logs are supplied to the tower to completely fill the same and hot fresh water or hot sulfite liquor is sprayed down from the plate 16 and may be permitted to accumulate in the tank below to about the level indicated in the drawing. The logs should remain in the soaking liquid for a certain period, say 2 hours, or as much longer as may be necessary to properly loosen the bark so that it can subsequently be removed by the barking drum. In the initial operation of the apparatus, after the logs in the immediate vicinity of the conveyer 27 have been sufficiently treated, they may be gradually removed by starting this conveyer into operation. Thereafter, fresh logs are supplied from time to time to the top of the apparatus and undergo treatment, the duration of which depends upon the length of time it takes for the logs to pass down through the tower to the conveyer, it being intended that the latter part of the apparatus shall be operated slowly, or if necessary only at intervals, to remove the logs gradually and thus insure that they shall remain within the tower for a sufficient length of time to complete the soaking operation. By means of the mechanism for adjusting the position of the inner end of the conveyer the latter may be set at any angle most desirable for insuring the removal of the logs as they reach the base of the tower. During the operation of the apparatus the water or other liquid should be supplied through the pipe 15 at such a rate as to cause it to trickle over the mass of logs within the tower, and it may be kept hot by steam supplied through pipe 50. There will, of course be a certain loss of liquid due to evaporation and absorption by the wood and bark, and this must be made up from time to time by a supply of fresh liquid taken in through the pipe 17 and forced into the tower by the pump 13.

While a certain preferred embodiment of the invention has been illlustrated in the drawings, it will be understood that various changes in the details of the apparatus may be made without departing from the principle of the invention.

We claim:

1. Apparatus for treating logs preliminary to removing bark therefrom, comprising a tank, a tower above and communicating with the tank, means for feeding logs into the top of the tower, means at the top of the tower for supplying liquid thereto and means in the tank for removing logs therefrom.

2. Apparatus for treating logs preliminary to removing bark therefrom comprising a tank, a tower above and communicating with the tank, means for feeding logs into the top of the tower, means at the top of the tower for supplying liquid thereto, means for withdrawing liquid from the tank and means in the tank for removing logs therefrom.

3. Apparatus for treating logs preliminary to removing bark therefrom, comprising a tower having an inclined floor and a horizontal floor, a conveyer mounted above the horizontal floor with one end adjacent the lower end of the inclined floor, means for feeding logs into the top of the tower, and means at the top of the tower for supplying liquid thereto.

4. Apparatus for treating logs preliminary to removing bark therefrom comprising a tank, a tower above and communicating with the tank, means for supplying liquid at the top of the tower, means for feeding logs into the top of the tower, means communicating with said tank and said supplying means by which liquid may be withdrawn from the tank and means in the tank for conveying logs therefrom.

5. Apparatus for treating logs preliminary to removing bark therefrom comprising a tower having an inclined perforated floor and a tank beneath said tower, a conveyer mounted in the tank with one end adjacent the edge of the inclined floor, means whereby the said end of the conveyer may be raised or lowered, means for supplying steam beneath the inclined floor, and means whereby logs may be supplied to the upper end of the tower.

6. Apparatus for treating logs preliminary to removing bark therefrom comprising a base, a tank in said base, a tower above the base and communicating with the tank, a pump, a passage-way between the tank and the pump, a supply pipe communicating with the pump, a pipe leading from the pump to the top of the tower and a deflector at the top of the tower adjacent the end of the last named pipe.

7. Apparatus for treating logs preliminary to removing bark therefrom, comprising a base, a tank within the base, and a tapering circular tower above the base and provided with a door near the base.

8. Apparatus for treating logs preliminary to removing bark therefrom, comprising a base, a tank in the base, a log conveyer within the tank, a tapering circular tower above the base, and provided with an aperture in its upper wall through which logs may be fed, and means within the tower above the aperture for supplying liquid to logs within the tower.

9. Apparatus for treating logs preliminary to removing bark therefrom, comprising a base, a tank within the base, and a tapering circular tower above the base and provided with a door near the base and having a lining of suitable liquid resistant material.

10. Apparatus for treating logs preliminary to removing bark therefrom. comprising a tower having an inclined floor and a horizontal floor, a conveyer mounted above the horizontal floor with one end adjacent the lower end of the inclined floor, means for feeding logs into the top of the tower, means at the top of the tower for supplying liquid thereto and means adjacent the other end of the conveyer for conveying logs from said apparatus after being discharged from the conveyer.

In testimony whereof we affix our signatures.

OLE LUDVIG BERGER.
HERBERT GUETTLER.